United States Patent [19]

Reuland

[11] 3,951,267
[45] Apr. 20, 1976

[54] APPARATUS FOR TESTING THE END PORTIONS OF CIGARETTES OR THE LIKE

[75] Inventor: Joachim Reuland, Hamburg, Germany

[73] Assignee: Hauni-Werke Korber & Co., KG, Hamburg-Bergedorf, Germany

[22] Filed: Aug. 23, 1974

[21] Appl. No.: 499,900

[30] Foreign Application Priority Data
Aug. 30, 1973 Germany............................ 2343668
Dec. 20, 1973 Germany............................ 2363365

[52] U.S. Cl. .............................. 209/73; 209/74 M; 209/81 R; 324/61 QS; 331/65
[51] Int. Cl.² .............................................. B07C 5/08
[58] Field of Search ..................... 209/73, 74, 81 R; 324/61 SQ, 61 R; 331/65, 74 M

[56] References Cited
UNITED STATES PATENTS

| | | | |
|---|---|---|---|
| 3,001,648 | 9/1961 | Molins | 209/81 R |
| 3,485,357 | 12/1969 | Payne | 209/73 |
| 3,671,857 | 6/1972 | Bergmanis | 324/61 QS |
| 3,723,865 | 3/1973 | Batey | 324/61 R |

*Primary Examiner*—Allen N. Knowles
*Attorney, Agent, or Firm*—Kane, Dalsimer, Kane, Sullivan and Kurucz

[57] ABSTRACT

Apparatus for determining the mass of tobacco shreds in the end portions of the rod-like tobacco filters of filter cigarettes has a conveyor which transports a series of cigarettes sideways so that the end portions of successive fillers travel between or past two stationary electrodes of a capacitor which is connected with a source of high-frequency voltage serving to establish a high-frequency field in the path of successive end portions. The end portions influence the field to an extent which is indicative of the mass of tobacco therein, and the influence of successive end portions upon the field is evaluated by a circuit which produces signals serving to segregate cigarettes with fillers having defective end portions.

26 Claims, 11 Drawing Figures

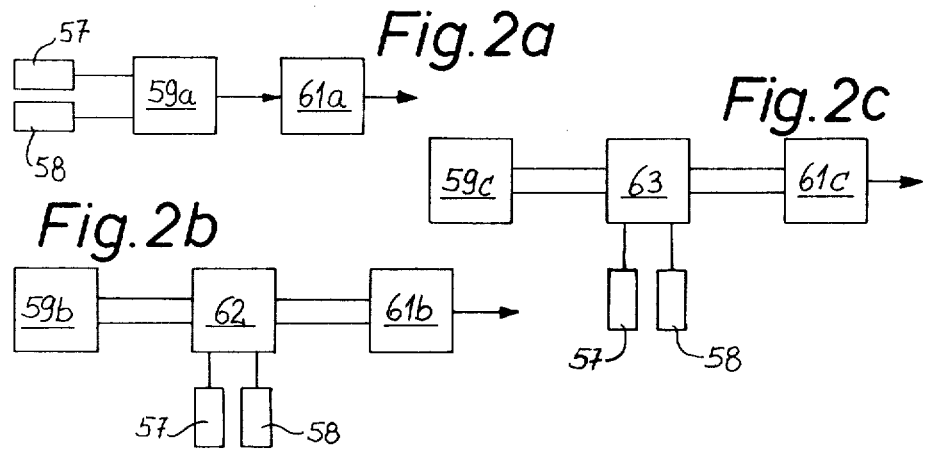
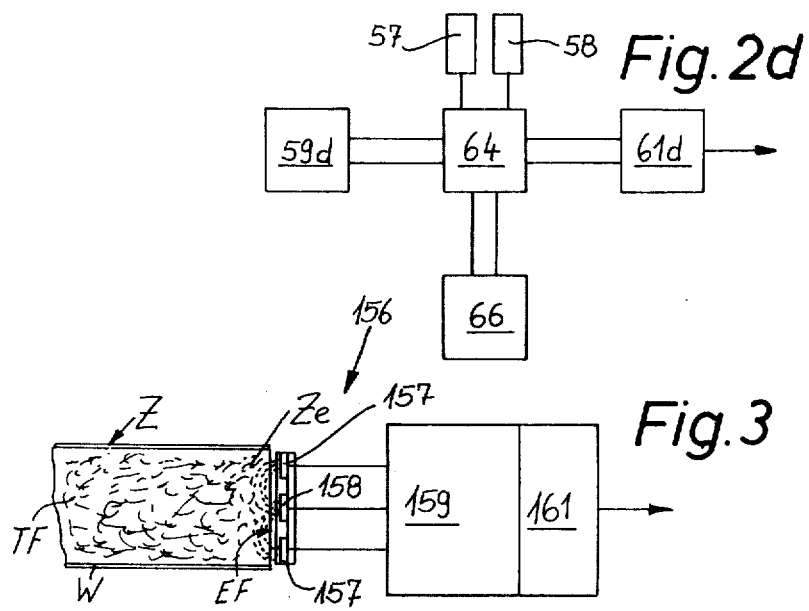
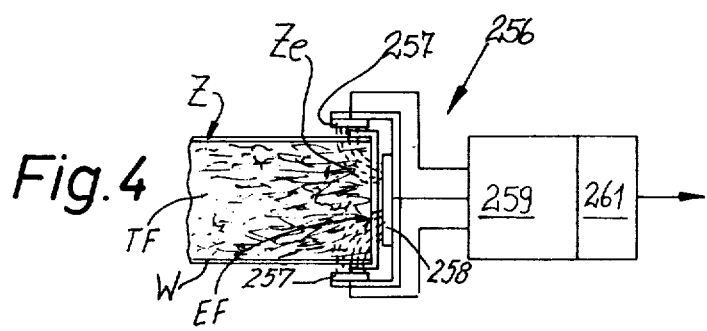

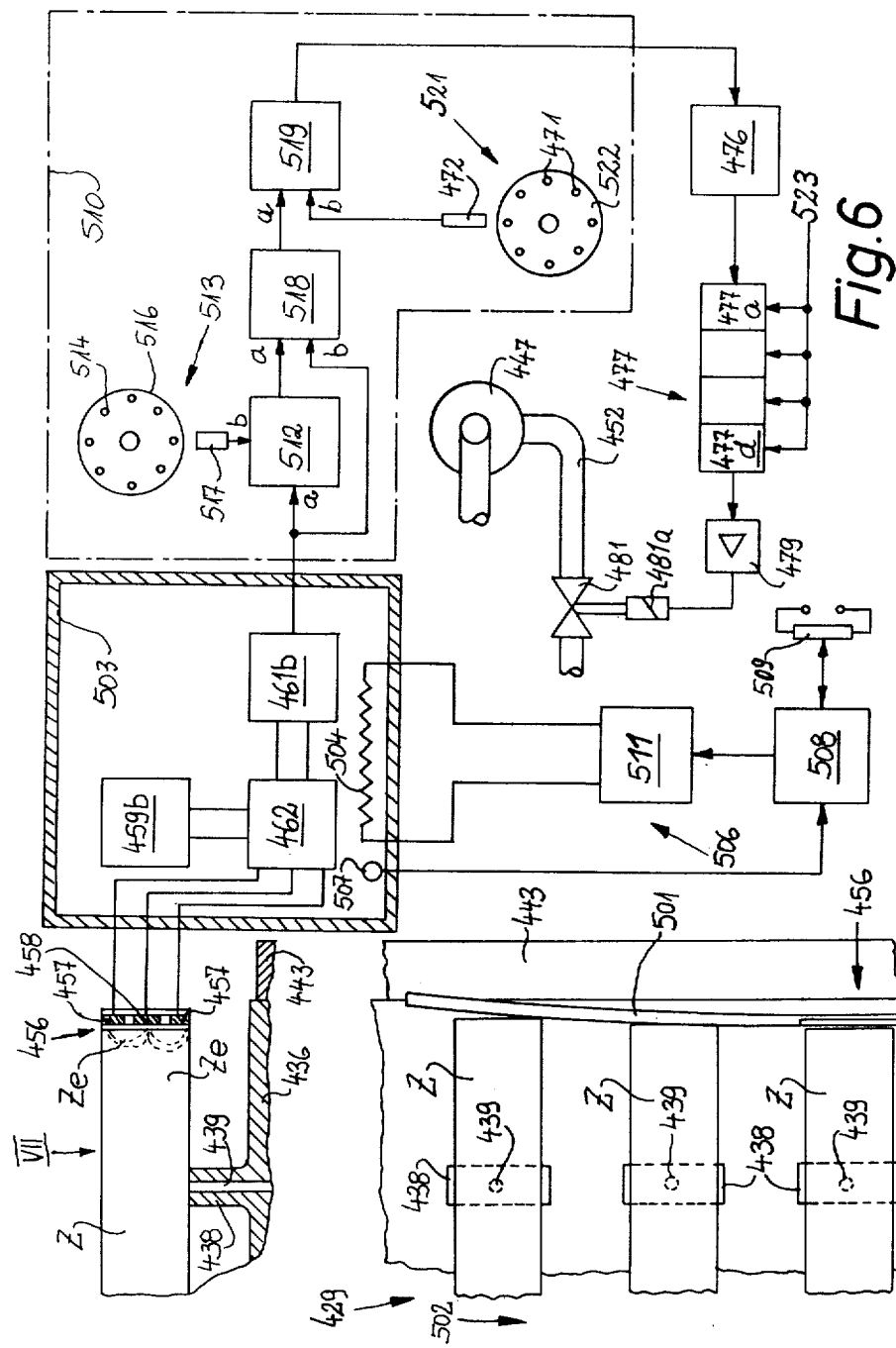

{ 3,951,267 }

APPARATUS FOR TESTING THE END PORTIONS OF CIGARETTES OR THE LIKE

BACKGROUND OF THE INVENTION

The present invention relates to improvements in apparatus for testing cigarettes or analogous rodshaped articles which constitute or form part of smokers' products. More particularly, the invention relates to improvements in apparatus for testing those end portions of cigarettes, cigars, cigarillos or filter rod sections which contain fibrous material, especially tobacco. Still more particularly, the invention relates to improvements in apparatus which can be used to determine the mass or quantity of fibrous material in the end portions of cigarettes or the like, for example, in both end portions of a plain cigarette, cigar or cigarillo or in that end portion of a filter cigarette, cigarillo or cigar which is remote from the filter tip.

It is well known to test cigarettes for the purpose of determining the mass of tobacco shreds in their end portions. Such testing is desirable because the smoker is annoyed or inconvenienced if the end portions of a plain cigarette or the tobacco-containing end portions of filter cigarettes contain too little tobacco. Thus, additional tobacco shreds are likely to escape during removal of such cigarettes from their packs, the lighting of an improperly filled end portion of a cigarette is likely to produce a flame, and cigarettes with improperly filled tobacco-containing end portions cannot be manipulated properly during transport from a cigarette making machine to storage, into trays, or directly into a packing machine.

Presently known apparatus which test the firmness of tobacco-containing end portions of cigarettes or the like rely primarily on mechanical scanning. Such apparatus employ pins which are biased against the end faces of rod-like tobacco fillers in cigarettes and the extent to which a pin penetrates into the filler is indicative of the mass of tobacco shreds in the tested end portion of the cigarette. An advantage of pin-shaped scanning devices is that, by properly selecting the dimensions of their tobacco-engaging surfaces, the pins can actually produce a firming or densifying effect by compacting the end portion of a filler if the end portion contains less than a satisfactory quantity of tobacco shreds. On the other hand, mechanical scanning devices are likely to damage or deface the cigarettes, and their inertia is relatively high so that the testing cannot be performed at speeds at which the cigarettes issue from a modern high-speed cigarette making machine.

It was further proposed to determine the mass of tobacco particles in the end portions of cigarettes by resorting to a testing apparatus wherein the cigarettes to be tested are transported sideways in the flutes of a drum-shaped conveyor and the conveyor carries a number of electrodes, one for each flute. The electrodes on the conveyor travel past a stationary electrode whereby the capacitance of the capacitor including the stationary electrode and the immediately adjacent mobile electrode indicates or represents the mass of tobacco in the end portion of the respective cigarette. Such testing apparatus are quite expensive and their maintenance cost is high because each mobile electrode must be connected with a source of high-frequency voltage. Moreover, the characteristics of each capacitor including the stationary electrode and any one of the mobile electrodes must be identical; this necessitates a complex calibrating operation which must be carried out by skilled persons.

It is also known to determine the mass of tobacco in successive increments of a continuous wrapped rod-like tobacco filler by causing the filler to travel lengthwise between two stationary electrodes. Such apparatus cannot be used for determining the mass of tobacco in the end portions of discrete cigarettes because the electrodes permit a continuous rod or a single file of cigarettes to move lengthwise but not sideways.

SUMMARY OF THE INVENTION

An object of the invention is to provide a novel and improved apparatus which can be used for testing of the tobacco-containing end portions of plain or filter tipped cigarettes, cigars or cigarillos or the end portions of filter rod sections wherein a wrapper surrounds a filler of fibrous material.

Another object of the invention is to provide a testing apparatus which can determine the mass of fibrous material in the end portions of cigarettes or the like with a high degree of accuracy, at the speed at which the articles issue from a modern high-speed maker, and which need not rely on mobile pins or analogous mechanical scanning devices having a high inertia and being likely to damage or deface the articles.

A further object of the invention is to provide an apparatus which constitutes an improvement over and is simpler and less expensive than presently known apparatus for capacitive determination of the mass of tobacco in the end portions of cigarettes or the like.

An additional object of the invention is to provide an apparatus for determining the mass of tobacco in the end portions of discrete cigarettes or analogous smokers' products by resorting to a single capacitor whose calibration is simpler than the calibration of plural capacitors in conventional testing apparatus.

Still another object of the invention is to provide the apparatus with novel and improved means for evaluating and processing signals which are indicative of the mass of tobacco in the end portions of discrete cigarettes or the like.

The apparatus of the present invention is utilized for determining the mass of fibrous material in the end portions of discrete or grouped rod-shaped articles, particularly for determining the mass of tobacco in the end portions of cigarettes or analogous rod-shaped smokers' products.

The apparatus comprises means for conveying a succession of rod-shaped articles sideways so that the fibrous-material-containing end portion of each article advances along a predetermined path (e.g., along an endless path defined by a drum-shaped rotary conveyor which is formed with article receiving means in the form of flutes, or along an endless path defined by an endless chain conveyor having article receiving means in the form of chambers or cells each of which can receive a group of rod-shaped articles), capacitor means having at least one pair of spaced-apart electrodes adjacent to a section of the path for the end portions of rod-shaped articles, and a source of high-frequency voltage which is connected with the electrodes to establish between the electrodes a high-frequency field, at least while the end portion of an article is located in the aforementioned section of the path. At least a portion of the high-frequency field is located in the aforementioned section of the path so that the end portions of successive articles travel across such portion of the field and influence the field to an extent which is a function of the mass of fibrous material in the end portions. The testing apparatus further comprises means for evaluating the influence of successive end portions upon the high-frequency field.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2a is a circuit diagram of a first source of high-frequency voltage for use in the testing apparatus of FIG. 2;

FIG. 2b is a circuit diagram of a second source;

FIG. 2c is a circuit diagram of a third source;

FIG. 2d is a circuit diagram of a fourth source;

FIG. 3 shows a modified capacitor for the testing apparatus of FIG. 2;

FIG. 4 shows a further capacitor for the testing apparatus of FIG. 2;

FIG. 6 is a diagrammatic view of a testing apparatus which constitutes a further modification of the apparatus shown in FIG. 2; and FIG. 7 is a fragmentary developed view of the conveyor in the testing apparatus of FIG. 6, substantially as seen in the direction of arrow VII in FIG. 6.

DESCRIPTION OF THE PREFERRED EMBODIMENTS

Figure 1:
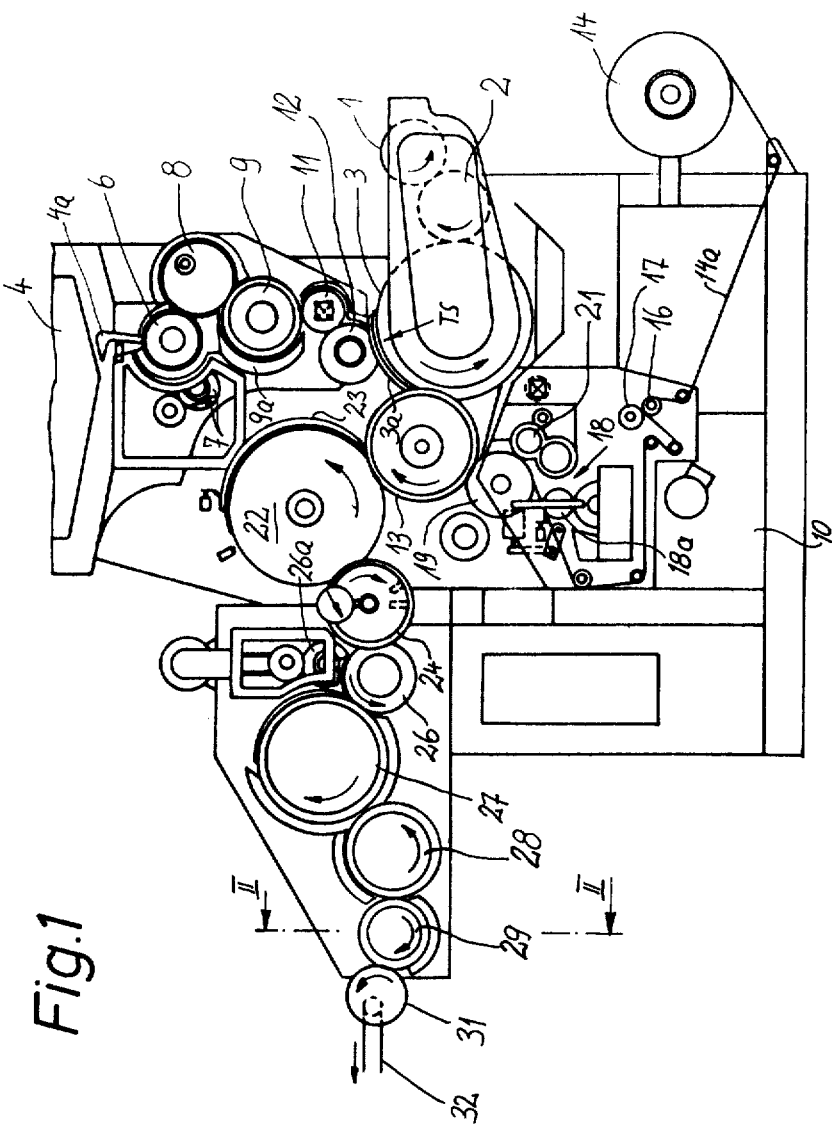
FIG. 1 is a schematic elevational view of a filter cigarette making machine which includes a testing apparatus embodying one form of the invention.

FIG. 1 shows a filter cigarette making machine of the type known as MAX (produced by Hauni-Werke, Körber & Co., K. G., Hamburg-Bergedorf, Western Germany). The machine is directly coupled to a cigarette rod making machine (not shown), e.g., a machine known as GARANT (also produced by Hauni-Werke) and having a rotary drumshaped transfer conveyor 1 which transports two rows of plain cigarettes of unit length in such a way that the cigarettes of each row move sideways. The cigarettes of one row are transferred onto one and the cigarettes of the other row are transferred onto the other of two rotary drum-shaped aligning conveyors 2 which are mounted in the frame 10 of the filter cigarette making machine and serve to align each cigarette of one row with a cigarette of the other row before the thus aligned pairs of cigarettes are transferred into successive peripheral flutes of a rotary drum-shaped assembly conveyor 3 which is also mounted in the frame 10. The aligning conveyors 2 are necessary because each flute of the transfer conveyor 1 contains a single cigarette whereby the first, third, etc. cigarettes form one row and the second, fourth, etc. cigarettes form the other row. The pairs of aligned plain cigarettes in the flutes of the assembly conveyor 3 are spaced apart so that they define gaps having a width corresponding to or preferably slightly exceeding the length of a filter rod section of double unit length.

The frame 10 further supports a magazine 4 which contains a supply of filter rod sections of 6 times unit length. The filter rod sections descend (by moving sideways) in a chute 4a and enter successive flutes of a rotary drum-shaped severing conveyor 6 which cooperates with two disk-shaped knives 7 to subdivide each filter rod section of 6 times unit length into a group of three aligned filter rod sections of double unit length. The knives 7 are coaxial with each other and are rotated at a high speed by the main prime mover (not shown) of the filter cigarette making machine. Each filter rod section of a group is taken over by one of three rotary drum-shaped staggering conveyors 8 which rotate at different speeds and/or transport the respective filter rod sections of double unit length through different distances so as to insert the thus staggered filter rod sections into successive flutes of a rotary drum-shaped shuffling conveyor 9 which cooperates with one or more cams 9a to place each filter rod section into exact alignment with the preceding filter rod section. The thus aligned filter rod sections of double unit length form a single row and are transferred into successive flutes of a rotary drum-shaped transfer conveyor 11 which transfers the filter rod sections into successive flutes of a rotary drum-shaped accelerating conveyor 12. The latter constitutes a means for inserting successive filter rod sections of double unit length into the gaps between successive pairs of plain cigarettes of unit length in the flutes of the assembly conveyor 3 (such insertion takes place at a transfer station TS), and the thus obtained groups of three coaxial rod-shaped articles (each group comprises two plain cigarettes of unit length and a filter rod section of double unit length therebetween) and thereupon condensed or shortened during travel between two stationary cams 3a so that the inner ends of the plain cigarettes of each group abut against the adjacent ends of the respective filter rod section of double unit length. The groups are then introduced into successive flutes of a rotary drum-shaped transfer conveyor 13 which advances them past a rotary suction drum 19.

The frame 10 supports a roll 14 of convoluted wrapping material 14a (e.g., cigarette paper or cork) which forms an elongated web and is transported lengthwise by two driven advancing rolls 16, 17 to move toward and past the roller-shaped applicator 18a of a paster 18 which coats the underside of the web 14a with a film of suitable adhesive. The leading end of the web 14a is attracted to the periphery of the suction drum 19 which cooperates with a rotary knife 21 to subdivide the web 14a into a series of adhesive-coated uniting bands. Each band is attached to a group in the adjacent flute of the transfer conveyor 13 in such a way that a portion of the band adheres to the respective filter rod section of double unit length and to the adjacent inner end portions of the respective plain cigarettes. The groups (each of which carries an adhesive-coated uniting band) are thereupon transferred onto a rotary drum-shaped wrapping conveyor 22 which cooperates with a stationary or mobile rolling device 23 to convolute each adhesive-coated uniting band around the respective filter rod section as well as around the inner end portions of the respective plain cigarettes and to thereby convert each group into a filter cigarette of double unit length.

The filter cigarettes of double unit length are transferred onto a first rotary testing conveyor 24 which forms part of a device for monitoring the condition of wrappers on the filter cigarettes of double unit length and for segregating those cigarettes whose wrappers are defective. At least the satisfactory cigarettes of double unit length are transferred onto a rotary drum-shaped severing conveyor 26 which cooperates with a rotary disk-shaped knife 26a to sever each filter cigarette of double unit length midway between its ends so that each such cigarette yields two coaxial filter cigarettes of unit length. The thus obtained pairs of aligned filter cigarettes of unit length are transferred onto an inverting conveyor 27 which inverts one cigarette of each pair end-for-end and places it into the gap between the adjacent non-inverted cigarettes so that all filter cigarettes of unit length form a single row wherein the cigarettes travel sideways and all filter rod sections of unit length (the knife 26a severs each filter rod section of double unit length midway between its ends) face in the same direction.

The cigarettes of the single row of filter cigarettes of unit length are thereupon accepted by a fluted rotary drum-shaped transfer conveyor 28 which delivers them to a second rotary testing conveyor 29. The conveyor 29 forms part of a testing apparatus which monitors the density of tobacco-containing ends of filter cigarettes of unit length and serves to segregate cigarettes with defective tobacco-containing ends. At least the satisfactory filter cigarettes of unit length are thereupon accepted by a further rotary drum-shaped transfer conveyor 31 which deposits them on the upper stretch of a take-off conveyor 32 (here shown as an endless belt). The conveyor 32 delivers satisfactory filter cigarettes of unit length to a tray filling machine, directly to a packing machine, or to storage.

Figure 2:
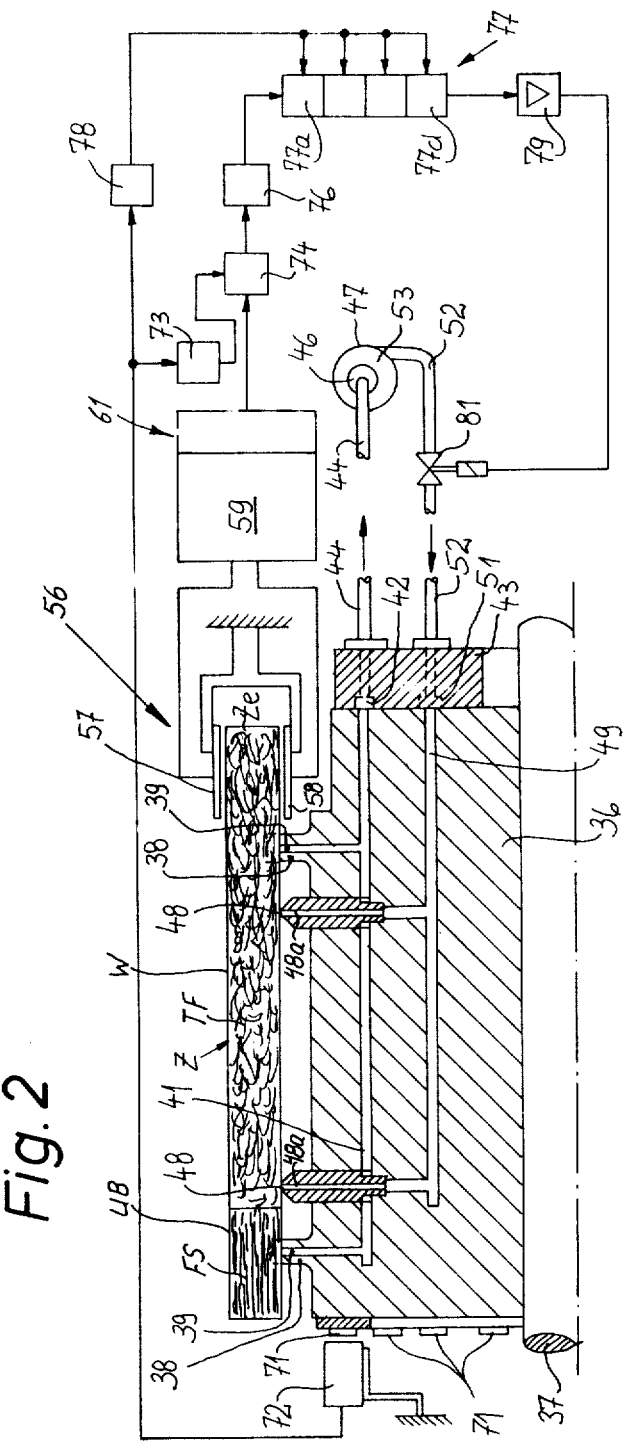
FIG. 2 is an enlarged fragmentary partly diagrammatic and partly sectional view of the testing apparatus, the section being taken in the direction of arrows as seen from the line II—II of FIG. 1.

FIG. 2 shows the details of a testing apparatus which includes the conveyor 29 of FIG. 1. A filter cigarette of unit length is shown at Z; this cigarette has a rod-like filter TF of tobacco shreds, a tubular wrapper W for the filler TF, a filter plug or section FS of unit length, and one-half of an adhesive-coated uniting band UB which connects the wrapper W with the wrapper of the section FS. The reference character Ze denotes the tobacco-containing end portion of the cigarette Z, i.e., the outer end portion of the rod-like filter TF in the wrapper W.

The conveyor 29 comprises a rotary drum-shaped body 36 which is mounted on and rotated by a constantly driven shaft 37. The periphery of the body 36 is formed with pairs of aligned receiving means in the form of flutes 38 having concave sockets one of which receives a portion of a wrapper W and the other of which receives a portion of the respective uniting band UB. The operation of the conveyor 29 is synchronized with operation of the transfer conveyor 28 so that the latter delivers discrete filter cigarettes Z of unit length into successive pairs of aligned flutes 38 on the continuously rotating body 36. Each flute 38 has at least one substantially radially extending suction port 39 which attracts the respective cigarette Z during transport from the transfer station between the conveyors 28, 29 toward the transfer station between the conveyors 29, 31. The inner ends of the ports 39 communicate with axially parallel channels 41 which are machined into the body 36 and each of which is a blind bore having its open end at the right-hand end face of the body 36, as viewed in FIG. 2. The aforementioned sockets of the flutes 38 are preferably bounded by concave surfaces which can receive the adjacent portions of wrappers W and uniting bands UB with minimal clearance to thus insure that the cigarettes Z are properly attracted to the body 36 during transport from the conveyor 28 toward the conveyor 31.

The right-hand end face of the drum-shaped body 36 is adjacent to and sealingly engages the left-hand end face of a stationary valve plate 43 which is formed with an arcuate groove 42 communicating with those channels 41 which are located between the conveyors 28 and 31, as considered in the direction of rotation of the body 36. The groove 42 is connected to the suction inlet 46 of a fan 47 by a suction pipe 44 so that those ports 39 which communicate with channels 41 travelling past the groove 42 attract the respective cigarettes Z during transport past a monitoring device 56 for the tobacco-containing end portions Ze of successive cigarettes Z.

The body 36 further supports pairs of ejector nozzles 48 which are mounted between the aligned flutes 38 and have axial passages 48a communicating with axially parallel blind bores or channels 49 which are machined into the body 36. The open ends of successive channels 49 which travel from the transfer station between the conveyors 28, 29 toward the transfer station between the conveyors 29, 31 communicate with a short second arcuate groove 51 of the valve plate 43. The groove 51 is connected with the pressure outlet 53 of the fan 47 by a pipe 52 which contains a shutoff valve 81, preferably a normally closed solenoid-operated valve. When the valve 81 is open, jets of compressed air issuing from the respective passages 48a expel a defective cigarette Z from the associated flutes 38 whereby such cigarette descends by gravity or is propelled into a suitable receptacle or onto a collecting conveyor, not shown. The groove 51 of the valve plate 43 is located downstream of the monitoring device 56, as considered in the direction of travel of cigarettes Z from the conveyor 28 toward the conveyor 31.

The monitoring device 56 is a capacitor having two plate-like electrodes 57 and 58 which are mounted opposite each other and are respectively adjacent to the outer and inner sides of a predetermined section of an endless path along a portion of which the end portions Ze of successive cigarettes Z travel on their way from the conveyor 28 toward the conveyor 31. As shown, the right-hand flute 38 of FIG. 2 is spaced apart from the valve plate 43 and from the right-hand end face of the body 36, and the length of each cigarette Z is such that, if the left-hand end of the cigarette is substantially flush with the left-hand end face of the body 36, the right-hand end portion Ze extends well beyond the right-hand flute 38 so that it can pass between the electrodes 57 and 58.

The electrodes 57 and 58 of the capacitor 56 are connected to an energy source 59, preferably a source of high-frequency voltage. The positions of electrodes 57, 58 with respect to each other and with respect to the path of successive tobacco-containing end portions Ze is selected in such a way that an end portion Ze which travels between the electrodes 57, 58 traverses all or nearly all field lines of a high-frequency electric field which is established between the electrodes by the source 59. The source 59 is connected with an evaluating circuit 61 which produces signals representing the condition of a tested end portion Ze, i.e., the quantity or mass of tobacco in that part of a rod-like filler TF which passes between the electrodes 57, 58. The nature of signals which are being transmitted by the evaluating circuit 61 is indicative of the extent to which the respective end portions Ze influence the high-frequency field between the electrodes 57, 58, i.e., of the mass of tobacco shreds in the end portions Ze.

A testing apparatus wherein the electrodes of the capacitor are mounted in a manner as shown in FIG. 2 is highly sensitive and reliable because the end portions Ze pass across all or nearly all field lines of the high-frequency field which develops between the electrodes when the capacitor is connected with a source of high-frequency voltage. Such testing apparatus can be used with advantage in or in combination with modern high-speed cigarette makers which turn out up to and in excess of 4,000 cigarettes per minute. The electrodes 57, 58 do not interfere with the travel of end portions Ze along that section of the endless path, defined by the conveyor 29, which is adjacent to the capacitor 56.

FIG. 2a shonws a first evaluating circuit 61a which can be used in the testing apparatus of FIG. 1. The source 59a is an oscillator circuit whose frequency-determining component is capacitor 56 including the electrodes 57, 58. The frequency varies in dependency on the mass of tobacco in an end portion Ze between the electrodes 57, 58, and such frequency variations are detected by the circuit 61a which is a so-called phase-locked loop circuit of the type NE 560 produced by Signetics Corporation. The intensity of the voltage signal at the output c of the evaluating circuit 61a is indicative of the mass of tobacco particles between the electrodes 57, 58 or of the deviation of the measured quantity of tobacco particles between the electrodes 57, 58 from a predetermined or optimum quantity (in a satisfactory end portion Ze).

FIG. 2b shows a modified evaluating circuit 61b which is connected with the output of a resonant circuit 62. The capacitor including the electrodes 57, 58 constitutes the frequency-determining component of the resonant circuit 62 which is further connected with the output of a conventional high-frequency oscillator 59b. The frequency of pulses supplied by the oscillator 59b can be stabilized by a quartz crystal or the like. A suitable oscillator is marketed by the Radio Corporation of America and is described on page 507 of the 1967 edition of the RCA Transistor Manual. The output c of the evaluating circuit 61b transmits signals whose intensity is indicative of the quantity of tobacco in an end portion Ze between the electrodes 57 and 58 of FIG. 2b. The output of the circuit 62 transmits current or voltage signals whose amplitude is indicative of the measured quantity of tobacco between the electrodes 57, 58.

In the testing apparatus which embodies the structure of FIG. 2b, the source of high-frequency voltage for the capacitor can be said to include the oscillator 59b and the resonant circuit 62.

The circuit arrangement of FIG. 2b is somewhat more complex than that of FIG. 2a because the oscillator circuit 59a of FIG. 2a need not include a quartz crystal or other frequency stabilizing means. The circuit arrangement of FIG. 2b is preferred when the frequencies are relatively high, e.g., in the range of 100 megahertz.

FIG. 2c shows a third evaluating circuit 61c. The capacitor including the electrodes 57, 58 is the frequency-determining component of an electric resonant circuit 63 which is connected with the output of a high frequency oscillator 59c. The latter supplies voltage pulses whose frequency is stabilized by a quartz crystal or the like. The circuit 61c maintains the resonant circuit 63 in a state of resonance even if the capacity of the capacitor including the electrodes 57, 58 changes as a result of deviations of the quantity of tobacco in an end portion Ze between the electrodes 57, 58 from a predetermined optimum quantity. Thus, the evaluating circuit 61c constitutes an indicator for the value of an electrical parameter (current or voltage) of the resonant circuit 61c. This parameter is changed in order to maintain the circuit 61c in a state of resonancy. The details of a circuit arrangement which is analogous to that shown in FIG. 2c are disclosed, for example, in the commonly owned German Offenlegungschrift No. 2,165,819. This publication also discloses a circuit arrangement wherein the resonant circuit is maintained in a state of resonancy by automatically regulating an electrical parameter in the aforedescribed manner. The circuit arrangement of the German publication is used to determine the moisture content of tobacco; however, it is equally useful for determination of the mass of tobacco particles which pass between the electrodes 57 and 58.

In the circuit arrangement of FIG. 2c, the source of high-frequency voltage for the capacitor can be said to include the oscillator 59c and the circuit 63. The circuit 61c measures a parameter which must be changed in order to maintain the circuit 63 in a state of resonance, and the measured value of the parameter is indicative of the mass of tobacco shreds between the electrodes 57, 58.

In the embodiment of FIG. 2d, the capacitor including the electrodes 57, 58 is the frequency-determining component of an electric resonant circuit 64 which is connected with the output of a high-frequency oscillator 59d serving to supply a high-voltage signal whose frequency is stabilized by a quartz crystal or the like. The circuit 64 has a periodically varying reactance 66, e.g., a periodically variable capacitor which is dimensioned in such a way that the condition for resonance of the circuit 64 is established at some time during the change of the reactance of capacitor 66 from one to the other of its two extreme values, i.e., the circuit 64 is then in a state of resonancy. This means that the current and voltage of the resonant circuit each assume their maximum value once during the change of reactance value from one extreme to the other. The mass of tobacco between the electrodes 57, 58 can be determined by evaluating (at 61d) the maximum values of current and voltage because such values depend on the mass of tobacco in the end portions Ze passing across the field lines between the electrodes. The details of a circuit arrangement which is similar to that shown in FIG. 2d and wherein periodic variations of capacitance of a capacitor cause a resonant circuit to be periodically brought into resonance are disclosed in the commonly owned German patent No. 935,380 or U.S. Pat. No. 3,372,488. The patented circuit arrangements are used for determining the moisture content of tobacco; however, they are evidently suited for determination of the mass of tobacco in end portions of cigarettes or the like.

In the circuit arrangement of FIG. 2d, the parts shown at 59d, 64 and 66 together constitute a source of high-frequency voltage for the capacitor including the electrodes 57, 58. This circuit arrangement can be used as a substitute for the circuit arrangement of FIG. 2c in testing apparatus wherein the aforementioned maintenance of the resonant circuit 63 in a state of resonance presents too many problems. An advantage of the circuit arrangement of FIG. 2d is that, by properly selecting the reactance 66, one can insure that the circuit 64 is in a state of resonance during a period of change of reactance even if one does now know the conditions which must be met in order to maintain the circuit 64 in a state of resonance. Such period of change of the reactance 66 takes place when the current or voltage of the circuit 64 is at a maximum value.

Referring again to FIG. 2, the drum-shaped body 36 carries projections or lobes 71 which travel seriatim past a proximity detector 72 forming part of a timer which determines the timing of the testing of successive end portions Ze. The detector 72 transmits a signal whenever the end portion Ze of a cigarette Z is located in the space between the electrodes 57 and 58. The detector 72 is connected with a monostable multivibrator (trigger) 73 which transmits a signal of constant duration in response to each signal from the detector 72. The signal from the monostable multivibrator 73 is transmitted to the gate signal input of an electronic gate circuit 74. The circuit 74 has a second input which is connected to the evaluating circuit 61 and an output which is connected to the input of a threshold circuit 76, e.g., a Schmitt trigger. The output of the circuit 76 is connected with the first stage 77a of a shift register 77 which further receives pulses from a pulse shaper 78 connected to the detector 72. The switching periods between the monostable multivibrator 73 and pulse shaper 78 are selected in such a way that the pulse shaper 78 transmits to the shift register 77 a shift signal before the monostable multivibrator 73 causes the gate circuit 74 to transmit a signal from the evaluating circuit 61 to the threshold circuit 76 and on to the first stage 77a of the shift register 77. The last stage 77d of the shift register 77 is connected with an amplifier 79 which can energize the solenoid of the valve 81 to thereby open the valve and to permit compressed air to flow into the passages 48a of the ejector nozzles 48 which are located inwardly of a cigarette Z having a defective end portion Ze.

Since the cigarettes Z are normally transported at a very high speed, it would be difficult or costly to connect the source of high-frequency voltage (e.g., 59a) to the capacitor 56 only when the end portion Ze of a cigarette is located in the space between the electrodes 57, 58. The signal producing means 71, 72 insures that, even though the source is constantly connected with the capacitor 56, the first stage 77a of the shift register 77 receives a signal only when an end portion Ze enters the space between the electrodes.

The operation of the testing apparatus of FIG. 2 is as follows:

The machine of FIG. 1 produces filter cigarettes Z of unit length in the aforedescribed manner, and such cigarettes are fed to the inverting conveyor 27 which delivers a single row of cigarettes Z to the transfer conveyor 28. The latter delivers successive cigarettes Z to successive pairs of flutes 38 on the body 36 of the testing conveyor 29, and such cigarettes are attracted by suction in the respective ports 39 which communicate with the groove 42 of the valve plate 43. When the tobacco-containing end portion Ze of a cigarette Z enters the space between the electrodes 57, 58, the detector 72 transmits a signal to the monostable multivibrator 73 and to the pulse shaper 78. The properly shaped pulse which is transmitted to all stages of the shift register 77 causes a signal to advance from a preceding stage to the next-following stage of the shift register 77. The monostable multivibrator 73 transmits a gate signal to the gate circuit 74 which becomes conductive for a predetermined short interval of time so that a signal which is transmitted by the evaluating circuit 61 can reach the threshold circuit 76.

The intensity of signal transmitted from 61 to 76 is a function of the mass of tobacco in the respective end portion Ze. If the intensity of such signal is without a predetermined range (which range is indicative of the mass of tobacco particles in a satisfactory end portion Ze), e.g., if the intensity of the signal transmitted from 61 to 76 is indicative of an insufficiently filled end portion Ze, the output of the threshold circuit 76 transmits a "defect" signal which reaches the first stage 77a of the shift register 77. Such defect signal is thereupon advanced in stepwise fashion, in response to successive signals from the detector 72 to the pulse shaper 78, and ultimately reaches the amplifier 79 which energizes the solenoid of the valve 81 at the exact moment when the flutes 38 containing the defective cigarette Z are in a predetermined angular position in which the ejected cigarette can descend onto a removing conveyor or into a suitable collecting receptacle. The energization of the solenoid of the valve 81 is of short duration to thus insure that the testing apparatus segregates only that cigarette Z whose end portion Ze is defective. The shift register 77 insures that defective cigarettes Z are invariably ejected at a predetermined station irrespective of the speed at which the shaft 37 drives the body 36 of the testing conveyor 29. The pressure of compressed air which is supplied by the pipe 52 is sufficient to overcome suction in those ports 39 which attract the defective cigarette Z during travel past the ejecting station.

The cigarettes Z which are satisfactory (i.e., wherein the end portions Ze contain requisite quantities of tobacco particles) are permitted to advance beyond the ejecting station and are transferred into the flutes of the conveyor 31 for transport onto the upper stretch of the take-off conveyor 32. Thus, when the end portion Ze which is located between the electrodes 57, 58 contains a satisfactory quantity of tobacco particles, the signal transmitted from 61 to 76 causes a "satisfactory" signal to be applied to the first stage 77a of the shift register 77 and the valve 81 remains closed during transport of the respective (satisfactory) cigarette Z past the ejecting station.

FIG. 3 shows a modified stationary monitoring device or capacitor 156 having an annular electrode 157 and a central electrode 158. The electrodes 157, 158 are adjacent to the path of the end faces EF of tobacco-containing rod-like fillers TF of the cigarettes Z. The end faces EF are normal or substantially normal to the axes of the cigarettes Z. The electrode 157 is a flat ring and the electrode 158 is a flat circular disk which is located in the center of the space surrounded by the electrode 157. These electrodes constitute a so-called stray-field capacitor which produces a stray field and such field is traversed by the end portions Ze of successive cigarettes Z. The source 159 of high-frequency voltage and the evaluating circuit 161 can be constructed and assembled in a manner as described in connection with FIGS. 2a–2d.

Testing apparatus utilizing the capacitor 156 of FIG. 3 can be installed with advantage in machines wherein the peripheral surfaces of wrappers W surrounding the end portions Ze of fillers TF are not readily accessible. Such situation will arise if the cigarettes Z are to be tested subsequent to assembly into formations or groups which are ready to be introduced into packs or the like. A machine or group of machines which can utilize a testing apparatus employing the capacitor 156 of FIG. 3 is shown in FIG. 5.

In the monitoring device or capacitor 256 of FIG. 4, the electrode 257 is adjacent to both sides of the path for successive end portions Ze and the other electrode 258 is adjacent to the respective end face EF of the filler TF of a cigarette Z at the testing station. Thus, the position of the electrode 257 corresponds to that of the electrodes 57–58, and the position of the electrode 258 corresponds to that of the electrode 157 or 158. The circuits 259 and 261 can be constructed in a manner as described in connection with FIGS. 2a–2d.

Figure 5:
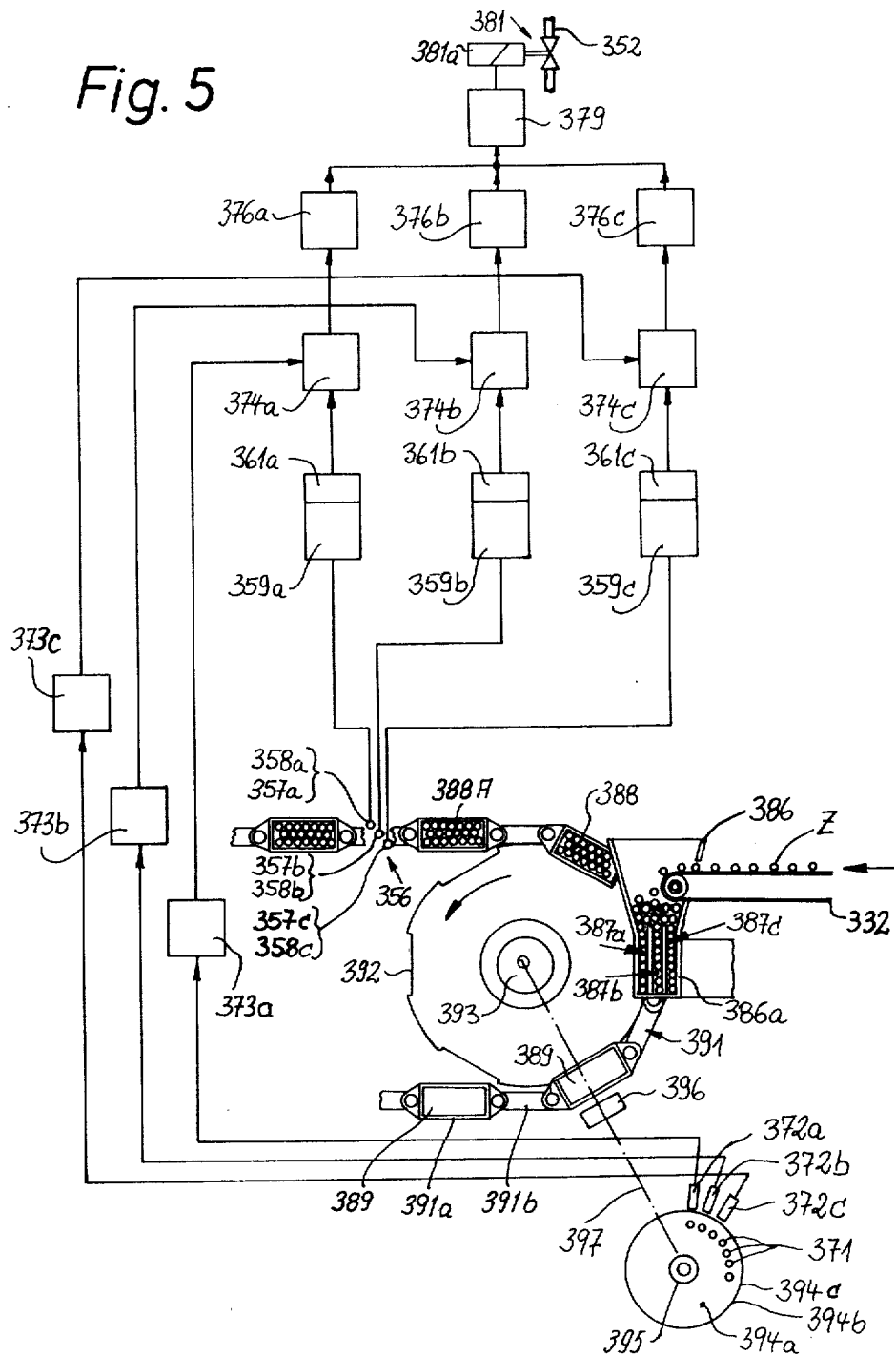
FIG. 5 is a diagrammatic view of an apparatus for the testing of blocks of cigarettes.

FIG. 5 shows a testing apparatus which includes a monitoring device 356 for the density of tobacco-containing end portions of blocks or arrays of cigarettes or the like. The conveying means of the testing apparatus is an endless chain conveyor 391 with alternating links 391a and 391b. The links 391a constitute cells with chambers or receiving means 389 for arrays 388 of 20 cigarettes each in the customary formation including two outer layers of seven cigarettes each and a median layer of six cigarettes which are staggered with respect to the cigarettes of the outer layers. It is assumed that the rod-shaped articles which form the blocks 388 are filter cigarettes Z of unit length. Such cigarettes are assumed to be produced in a machine or maker of the type shown in FIG. 1, and the take-off conveyor 332 of the producing machine (corresponding to the conveyor 32 of FIG. 1) delivers a layer of cigarettes Z into a magazine or hopper 386 the lower end portion 386a of which is formed with three ducts 387a, 387b, 387c each having a width slightly exceeding the diameter of a cigarette Z. The cigarettes which are delivered by the conveyor 332 descend in the ducts 387a–387c and form therein three columns of parallel horizontal cigarettes. The chain conveyor 391 is trained over at least two sprocket wheels 392 (only one shown) one of which is driven stepwise by a shaft 393 forming part of a Geneva movement or the like so as to rotate in a counterclockwise direction, as viewed in FIG. 5, and to place successive empty chambers 389 into register with the lower end portions of the ducts 387a–387c. A transfer member or pusher with three vertical prongs is movable at regular intervals to introduce the prongs into the respective ducts whereby the prongs expel a block 388 into the adjacent empty chamber 389. The pusher is thereupon retracted and the conveyor 391 is advanced by a step to place the foremost empty chamber 389 into register with the pusher. Satisfactory blocks 388 are transported to a packing machine to be draped into envelopes consisting of metallic foil, paper or cardboard and transparent plastic material in order to form therewith soft or hard packs in a manner not forming part of the invention. Reference may be had to the commonly owned U.S. Pat. No. 3,750,676 granted Aug. 7, 1973 to Kruse et al. This patent describes and shows the means for driving the chain 391, the aforementioned pusher, the means for moving the pusher, and the details of the packing machine.

It is clear that the magazine 386 need not receive the articles Z directly from a filter cigarette making machine. For example, the articles can be delivered by so-called chargers or trays, or they may be conveyed by a pneumatic system from one or more remote filter cigarette making machines. It is further clear that the testing apparatus including the conveyor 29 of FIG. 1 can be omitted if the filter cigarette making machine is directly coupled with the magazine 386 of FIG. 5 since the testing apparatus of FIG. 5 then performs the function of testing apparatus shown, for example, in FIG. 2. However, it is equally within the purview of the invention to utilize the testing apparatus of FIG. 5 in addition to the testing apparatus of FIG. 2, even if the filter cigarette making machine is directly coupled to the packing machine including the magazine 386 of FIG. 5, because at least some cigarettes Z are likely to lose tobacco during travel from the conveyor 29 of FIG. 1, through the magazine 386 and during transfer from the ducts 387a–387c into the chambers 389 of the cells 391a.

The testing apparatus of FIG. 5 can determine the condition of the tobacco-containing end portions of cigarettes Z in a chamber 389 as well as the absence of one or more cigarettes. The absence of a cigarette is tantamount to insufficient filling of the tobacco-containing end portion of the filler in a missing cigarette. It is desirable to expel an entire block 388 even if only a single cigarette of such block exhibits an improperly filled tobacco-containing end portion, and obviously also if one or more cigarettes are missing.

The monitoring device 356 includes three capacitors each having two electrodes shown at 357a–358a, 357b–358b and 357c–358c. These electrode pairs are preferably configurated and mounted in a manner as described in connection with FIG. 3, i.e., one (357a, 357b, 357c) of the electrodes is a ring which spacedly surrounds the other electrode (358a, 358b, 358c). The electrodes 357a–358a are adjacent to the end faces of the tobacco-containing end portions of cigarettes Z in the uppermost layer of an oncoming block 388, the electrodes 357b–358b are adjacent to the end faces of the tobacco-containing end portions of the median layer of cigarettes, and the electrodes 357c, 358c are adjacent to the end faces of tobacco-containing end portions of the lowermost layer of cigarettes Z. The length of stepwise advances of the chain 391 is such that an entire block 388 advances past the monitoring device 356 between two successive intervals of idleness or dwell of the sprocket wheel 392. This insures that each and every cigarette Z of a block 388 is tested before the chain 391 is brought to a standstill.

The three pairs of electrodes of the monitoring device 356 are connected with discrete sources 359a, 359b, 359c of high-frequency voltage, and these sources are respectively connected with discrete evaluating circuits 361a, 361b, 361c. The outputs of the evaluating circuits 361a–361c are respectively connected to inputs of gate circuits 374a, 374b, 374c, the gate signal inputs of which are connected with the outputs of discrete monostable multivibrators 373a, 373b, 373c. The outputs of the gate circuits 374a–374c are respectively connected with the inputs of discrete threshold circuits 376a, 376b, 376c each having an output which is connected to the input of an amplifier 379 which can energize the solenoid 381a of a normally closed valve 381 in a pipe 352 which is connected to a source (not shown) of pressurized gaseous or hydraulic fluid. When the valve 381 is open, the pipe 352 is free to admit pressurized fluid into one chamber of a suitable pneumatic or hydraulic motor serving to actuate a pusher registering with a chamber 389 downstream of the monitoring device 356 (as considered in the direction of movement of the upper stretch of the chain conveyor 391) whereby the pusher performs a working stroke to expel the adjacent block 388 from its cell 391a. Thus, the just described pusher serves as an ejector for blocks which contain cigarettes with unsatisfactory tobacco-continaing end portions or contain fewer than 20 cigarettes.

The means for transmitting pulses to the monostable multivibrators 373a–373c comprises three discrete pulse generators having discrete disks 394a, 394b, 394c mounted on a common drive shaft 395 which is rotated by the shaft 393 for the sprocket wheel 392 through the medium of a transmission 396 and in such a way that each of the disks 394a–394c completes a full revolution in response to a stepwise advance of the chain conveyor 391. The output shaft 397 of the transmission 396 drives the shaft 395.

The disks 394a–394c carry projections 371 which travel past stationary proximity detectors 372a, 372b, 372c whereby the detectors 372a–372c respectively transmit pulses to the associated monostable multivibrators 373a–373c at the exact moments when the cigarettes of the respective layer travel past the corresponding electrodes of the monitoring device 356. For example, the projections 371 (seven altogether) on the disk 394a will travel seriatim past the detector 372a at the exact moment when the end portions of successive cigarettes in the uppermost layer of the block 388A are in register with the electrodes 357a, 358a. Consequently, the monostable multivibrator 373a transmits to the gate pulse input of the corresponding gate circuit 374a seven consecutive gate pulses at the exact times when the other input of the gate circuit 374a receives signals from the corresponding evaluating circuit 361a. If the tested layer contains one or more cigarettes Z with defective tobacco-containing end portions, the corresponding signal or signals indicative of detected tobacco quantity pass through the gate circuit 374a and are applied to the threshold circuit 376a causing circuit 376a to generate a defect signal and apply such signal to the amplifier 379.

The operation of the testing apparatus of FIG. 5 is as follows:

When the chain conveyor 391 is advanced by a step, the block 388A of cigarettes Z moves toward, past and beyond the monitoring device 356. The foremost cigarette Z of the uppermost layer of the block 388A moves the end face of its tobacco-containing end portion into register with the electrodes 357a, 358a at the exact instant when the foremost projection 371 on the corresponding disk 394a causes the proximity detector 372a to trigger the monostable multivibrator 373a which thereupon transmits a gate signal to the gate-signal input of the gate circuit 394a. The evaluating circuit 361a transmits to the lower input of the gate circuit 374a a signal which is indicative of the condition of the tested end portion of the foremost cigarette Z in the upper layer of the block 388A. If the quantity of tobacco particles in the tested end portion is insufficient, the intensity of the signal at the output of the gate circuit 374a suffices to cause the threshold circuit 376a to generate and transmit to the amplifier 379 a defect signal which opens the valve 381 at the exact moment when the block 388A moves into register with the aforementioned pusher or ejector. The block 388A is automatically expelled from its chamber 389 so that it cannot reach the first pack-forming station of the packing machine. The gate circuit 374a allows the signal from the evaluating circuit 361a to reach the threshold circuit 376a because its lower input receives a signal (from the circuit 361a) at the exact moment when the left-hand input receives a gate signal from the monostable multivibrator 373a. The circuit 376a is designed in such a way that an incoming signal causes it to apply a defect signal to the amplifier 379 only when the tobacco-containing end portion of the corresponding cigarette Z is either missing or contains an unsatisfactory amount of tobacco.

The just described operation is repeated for the second-to-seventh cigarettes of the uppermost layer in the block 388A, always when the corresponding projection 371 of the disk 394a actuates the detector 372a while the tobacco-containing end portion of the respective cigarette Z is in register with the electrodes 357a and 358a.

The testing of cigarettes Z which form the median and lowermost layers of the block 388A is performed in the same way, except that such cigarettes respectively register with the electrodes 357b, 358b and 357c, 358c while the corresponding projections 371 (not shown) on the disks 394b, 394c respectively actuate the detectors 372b, 372c. The detection of a defective end portion in a cigarette Z of the median layer in the block 388A results in the energization of solenoid 381a in response to a signal from the threshold circuit 376b, and the detection of a defective end portion in a cigarette Z of the lowermost layer in the block 388A results in energization of the solenoid 381a in response to a signal from the threshold circuit 376c.

The testing apparatus of FIG. 5 is susceptible of many modifications without departing from the spirit of the invention. For example, the monitoring device will comprise a single capacitor or two capacitors if the receiving means or chambers 389 of the links 391a are designed to transport blocks which consist of a single layer or two layers of cigarettes, (e.g., two layers each consisting of ten parallel cigarettes). Moreover, the chain conveyor 391 can be replaced with another conveyor, e.g., a belt which carries pockets for blocks of cigarettes or other rod-shaped smokers' products.

An important advantage of the testing apparatus of FIG. 5 is that it can test all cigarettes in each of a series of successive blocks or arrays with a minimum of electronic equipment. Thus, all that is necessary is to provide a capacitor for each layer of a block, to provide a single ejector, and to provide means for actuating the single ejector whenever a block containing at least one defective cigarette (or wherein at least one cigarette is missing) reaches the ejecting station.

The testing conveyor 429 of FIGS. 6 and 7 is similar to or identical with the conveyor 29 of FIGS. 1 and 2. FIGS. 6 and 7 merely show the rotary drum-shaped body 436, several flutes 438, their suction ports 439, and a valve plate 443 which is adjacent to the right-hand end face of the body 436. The monitoring device 456 is a capacitor which comprises an annular electrode 457 and a disk-shaped electrode 458 which is surrounded by the electrode 457 in a manner similar to that shown in FIG. 3. In accordance with a feature of the testing apparatus of FIGS. 6 and 7, the electrodes 457, 458 of the capacitor 456 are mounted at the downstream end of a stationary cam 501 which constitutes a shifting or aligning means for moving the tobacco-containing end portions Ze of successive filter ciga rettes Z into an optimum position with respect to the electrodes 457, 458. In the illustrated embodiment, the electrodes 457, 458 are mounted directly on or in the end portion of the cam 501. The arrow 502 indicates the direction of rotation of the body 436. The force with which suction in the ports 439 attracts a filter cigarette Z to the respective flutes 438 is rather weak so that the stationary cam 501 can readily shift those cigarettes Z whose end portions Ze are not in an optimum position for testing by the capacitor 456 at the time the cigarettes are transferred onto the body 436 (e.g., from the transfer conveyor 28 of FIG. 1), whereby such mechanical shifting does not affect the appearance of the wrappers. The cam 501 insures that each and every end portion Ze is in an optimum position with respect to the electrodes 457, 458 during transport past the monitoring station. The testing apparatus further comprises an oscillator circuit 459b constituting a source of high-frequency voltage which generates a high-frequency voltage of constant frequency (such frequency can be stabilized by a quartz crystal). An example of such an oscillator circuit is described on page 507 of the 1967 volume of the aforementioned RCA Transistor Manual. The high-frequency voltage is applied to a resonance circuit 462 connected with an evaluating circuit 461b. The resonance circuit 462 comprises a frequency-determining capacitor formed by the electrodes 457, 458. The circuit 461b produces a signal (current or voltage) whose amplitude is a function of the mass of tobacco particles in the end portions Ze of cigarettes Z (such particles pass across the field lines between the electrodes 457, 458 of the capacitor 456). In other words, the output signal from the evaluating circuit 461a has a characteristic, a value of which is indicative of the quantity of tobacco particles in an end portion Ze.

The circuits 459b, 461b, 462 are confined in a casing or enclosure 503 which is heated by an electric resistance heater 504. The latter is controlled by a temperature regulating circuit 506 to insure that the interior of the casing 503 is maintained at a temperature which is constant or deviates negligibly from a predetermined temperature. The regulating circuit 506 comprises a thermistor 507 or another suitable temperature sensing device which is mounted in the casing 503 and is connected with one input of a signal comparing junction 508. Another input of the junction 508 is connected with a rated value selector 509 (e.g., an adjustable potentiometer) whose output signal is indicative of the desired temperature in the casing 503. When the intensity of signal from the thermistor 507 deviates from that which is supplied by the potentiometer 509, the junction 508 transmits a signal to an amplifier 511 which changes the heating action of the resistance heater 504, either in a direction to raise or in a direction to lower the temperature in the casing 503.

An advantage of the temperature regulating circuit 506 is that the circuits 459b, 461b, 462 in the casing 503 are always maintained at a given temperature which reduces the likelihood of drifting of signals transmitted by the evaluating circuit 461b.

The likelihood of drifting is further reduced due to the provision of a signal comparing circuit arrangement 510 which is designed to compare the intensity or another characteristic of first signals supplied by the output of the evaluating circuit 461b (i.e., signals which are indicative of the mass of tobacco particles in the end portions Ze) with the corresponding characteristic of independent second signals also transmitted by the evaluating circuit 461b. The circuit arrangement 510 comprises an analog signal storing circuit 512 which is a sample-and-hold amplifier (in its simplest form, the circuit 512 may constitute an adjustable RC-stage) having an input $a$ which is connected to the output of the evaluating circuit 461b. The circuit 512 stores a second signal for an interval of time which elapses between the receipt of such second signal from the evaluating circuit 461b and the receipt of the next-following second signal. The admission of second signals to be stored in the circuit 512 is controlled by a timer 513 having a disk 516 which is driven in synchronism with the body 436 of the conveyor 429 in such a way that its projections 514 actuate a proximity detector 517 during each interval between successive testing operations, i.e., the detector 517 transmits signals when a cigarette Z moves toward, but its end portion Ze is not as yet in, register with the electrodes 457, 458. Thus, the intensity of second signals which are transmitted to the input $a$ of the circuit 512 is independent of the mass of tobacco particles in the end portions Ze. Such independent second signals are compared with first signals which the input $b$ of a differential circuit 518 receives directly from the evaluating circuit 461b, and the thus obtained third signals are transmitted to the input $a$ of a gate circuit 519. The circuit 518 may constitute an operational amplifier and its input $a$ is connected with the output of the circuit 512.

The input $a$ of the circuit 512 receives a second signal when its input $b$ receives a signal from the detector 517, and such second signal is then stored until the detector 517 transmits the next signal to the input $b$. During such interval, the circuit 512 transmits the respective second signal to the input $a$ of the circuit 518. The input $b$ of the circuit 518 receives a signal at all times, and such continuously received signal constitutes a first signal which is indicative of the mass of tobacco particles in an end portion Ze when the latter is located between the electrodes 457, 458. The output of the circuit 518 continuously transmits a signal which is indicative of the difference between the signals received at its inputs $a$ and $b$, and the value of a characteristic of such continuously transmitted signal is indicative of the mass of tobacco particles in an end portion Ze at the moment when the end portion Ze is located between the electrodes 457, 458.

In order to insure that the gate circuit 519 will transmit only such (third) signals which are indicative of the mass of tobacco particles in successive end portions Ze, the circuit arrangement 510 further comprises a timer 521 having a disk 522 provided with projections 471 and being driven in synchronism with the body 436 of the conveyor 429 in such a way that a projection 471 actuates a proximity detector 472 when the end portion Ze of a cigarette A is located between the electrodes 457, 458. If desired, the projections 471 can be provided directly on the body 436, the same as shown for the projections 71 of FIG. 2. The detector 472 transmits pulses to the second input $b$ of the gate circuit 519 and, whenever this input receives a pulse, the output of the gate circuit 519 transmits a signal to the input of a threshold circuit 476, e.g., a Schmitt trigger. The output of the threshold circuit 476 (which constitutes a means for evaluating third signals) is connected to the first stage 477a of a shift register 477. The last stage 477d of the shift register 477 is connected with an amplifier 479 which can energize the solenoid 481a of a normally closed valve 481 in a pipe 452. The pipe 452 is connected with the pressure outlet of a fan 477 corresponding to the fan 47 of FIG. 2. The purpose of the valve 481 is analogous to that of the valve 81. The stages 477a–477d of the shift register 477 are connected to a pulse generator 523 of conventional design.

It will be seen that the circuit arrangement 510 insures that the threshold circuit 476 invariably receives (third) signals whose intensity or another characteristic is indicative of the difference between the characteristic of a first signal (this first signal is indicative of the mass of tobacco particles in an end portion Ze as well as of the pressure, temperature and moisture content of air which is contained in the space between the electrodes 457, 458 simultaneously with tobacco particles) and the characteristic of a second signal (which is indicative of the temperature, moisture content and pressure of air in the space between the electrodes 457, 458 when no tobacco is present in such space). Consequently, the characteristic of each third signal is indicative exclusively of the mass of tobacco particles in an end portion Ze. The differences between the characteristics of the first and second signals are not affected by eventual changes in the absolute value of signals which are being supplied by the evaluating circuit 461b due to drift or for another unforeseen reason.

If the intensity or another characteristic of a third signal is without a predetermined range (which is indicative of satisfactory mass of tobacco in an end portion Ze), the output of the threshold circuit 476 transmits a signal to the first stage 477a, and such signal is transported toward the stage 477d of the shift register 477 in response to transmission of pulses from the pulse generator 523. When a signal reaches the amplifier 479, the latter causes the solenoid 481a to open the valve 481 at the exact moment when a cigarette Z with a defective end portion Ze is located at the ejecting station.

The just described means for weakening or eliminating the influence of drift can be used with equal advantage in the testing apparatus of FIG. 5. It has been found that the drift eliminating means 506 and 510 are capable of further insuring that the testing apparatus segregates only those cigarettes whose tobacco-containing end portions are not acceptable for packing and sale to purchasers.

The circuit arrangement 510 of FIG. 6 assists the circuit 506 in eliminating or greatly reducing the drift of signals furnished by the output of the evaluating circuit 461b. The drift is due primarily to changes in temperature, moisture content and/or pressure of air.

The sample-and-hold amplifier 512 comprises suitable semiconductor means which regulates the admission of signals at the input b. During the interval of signal transmission to the input b, the internal resistance of the amplifier 512 is low in order to allow for rapid transmission of a second signal, and the internal resistance thereupon increases in order to retain the charge, i.e., the stored second signal. In other words, the internal resistance of the amplifier 512 can be changed in response to transmission of signals to its input b. The magnitude of control signals at the input b of the amplifier 512 is immaterial.

The signals which are transmitted to the input b of the differential circuit 518 drift because they depend on the mass of tobacco in an end portion Ze as well as on the temperature, pressure and moisture content of air. The signal which is transmitted to the input a of the circuit 518 is also likely to drift because its magnitude depends on the temperature, moisture content and pressure of air. Consequently, the difference between the magnitudes of the signals which are transmitted to the inputs a and b of the circuit 518 and which appears as a third signal at the output of the circuit 518 is not influenced by drift but is indicative exclusively of the mass of tobacco particles in an end portion Ze.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. Apparatus for determining the mass of fibrous material in the end portions of discrete or grouped rod-shaped articles, particularly for determining the mass of tobacco in the end portions of cigarettes or analogous smokers' products, comprising means for conveying a succession of rod-shaped articles sideways so that a fibrous material-containing end portion of each article advances along a predetermined path; capacitor means having at least two spaced-apart stationary electrodes adjacent to a section of said path; a source of high-frequency voltage connected with said electrodes to establish between said electrodes a high-frequency field, at least while the end portion of an article advances along said section of said path, at least a portion of said field being located in said section of said path so that the end portions of successive articles travel across said portion of said field and influence said field to an extent which is a function of the mass of fibrous material in said end portions; and means for evaluating the influence of successive end portions upon said field.

2. Apparatus as defined in claim 1, wherein said path is an endless path, and further comprising means for continuously driving said conveying means.

3. Apparatus as defined in claim 1, wherein said conveying means comprises a rotary conveyor having a plurality of receiving means for rod-shaped articles, said receiving means being arranged to maintain the articles therein in parallelism with the axis of said conveyor and said end portions of articles extending beyond the respective receiving means.

4. Apparatus as defined in claim 1, wherein said electrodes are located at the opposite sides of said section of said path so that the end portions of successive articles in said section travel between said electrodes and travel across at least the major portion of said field.

5. Apparatus as defined in claim 1 for determining the mass of fibrous material in the end portions of rodshaped articles whose end portions have end faces substantially normal to the axes of the respective articles, wherein at least one of said electrodes is adjacent to the end faces of end portions travelling along said section of said path.

6. Apparatus as define in claim 1, wherein said source comprises an oscillator circuit and said capacitor means is the frequency-determining component of said circuit, the frequency of said circuit during travel of an end portion along said section of said path being a function of the mass of fibrous material in such end portion and said evaluating means comprising a second circuit for measuring the frequency of said oscillator circuit.

7. Apparatus as defined in claim 1, wherein said source comprises a resonant circuit and a high-frequency osciallator connected with said circuit, said capacitor means constituting the frequency-determining component of said circuit and the amplitude of signals furnished by said circuit during travel of an end portion along said section of said path being a function of the mass of fibrous material in such end portion, said evaluating means comprising a second circuit for measuring the amplitude of said signals.

8. Apparatus as defined in claim 7, wherein said high-frequency osciallator comprises means for stabilizing the frequency of pulses supplied to said resonant circuit.

9. Apparatus as defined in claim 1, wherein said source comprises an electric resonant circuit and a high-frequency osciallator connected with said circuit, said capacitor means constituting the frequency-determining component of said circuit and said evaluating means comprising a second circuit which measures the value of a characteristic of signals transmitted by said resonant circuit, the value of said characteristic being a function of the mass of fibrous material in an end portion while such end portion advances along said section of said path.

10. Apparatus as defined in claim 9, wherein said high-frequency osciallator comprises means for stabilizing the frequency of pulses supplied to said resonant circuit.

11. Apparatus as defined in claim 1, wherein said source comprises an electric resonant circuit and a high-frequency oscillator which supplies to said circuit a high-frequency signal, said circuit comprising a periodically varying reactance and said capacitor means constituting a frequency-determining component of said circuit, said reactance varying between two extreme values and said circuit being in a state of resonance at least once while said reactance varies between said extreme values, said circuit being arranged to produce second signals during said state of resonance thereof and the maximum value of a characteristic of said second signals being a function of the mass of fibrous material in an end portion while such end portion advances along said section of said path, said evaluating means comprising a second circuit for measuring said maximum values.

12. Apparatus as defined in claim 11, wherein said oscillator comprises means for stabilizing the frequency of said high-frequency signal.

13. Apparatus as defined in claim 1, wherein said conveying means comprises a series of receiving means for groups of rod-shaped articles.

14. Apparatus as defined in claim 1, further comprising means for moving said conveying means and means for producing signals in response to travel of rod-shaped articles along said section of said path.

15. Apparatus as defined in claim 1, further comprising means for maintaining at least one of said capacitor means, said source and said evaluating means within a predetermined temperature range.

16. Apparatus as defined in claim 1, further comprising means for locating successive articles in a predetermined axial position during travel of said end portions along said section of said path.

17. Apparatus for determining the mass of fibrous material in the end portions of discrete or grouped rod-shaped articles, particularly for determining the mass of tobacco in the end portions of cigarettes or analogous smokers' products, comprising means for conveying a succession of rod-shaped articles sideways so that a fibrous material-containing end portion of each article advances along a predetermined path; capacitor means having at least two spaced-apart electrodes adjacent to a section of said path; a source of high-frequency voltage connected with said electrodes to establish between said electrodes a high-frequency field, at least while the end portion of an article advances along said section of said path, at least a portion of said field being located in said section of said path so that the end portions of successive articles travel across said portion of said field and influence said field to an extent which is a function of the mass of fibrous material in said end portions, said source comprising an oscillator circuit and said capacitor means constituting the frequency-determining component of said circuit, the frequency of said circuit during travel of an end portion along said section of said path being a function of the mass of fibrous material in such end portion; and means for evaluating the influence of successive end portions upon said field, comprising a phase-locked loop circuit for measuring the frequency of said oscillator circuit.

18. Apparatus for determining the mass of fibrous material in the end portions of discrete or grouped rod-shaped articles, particularly for determining the mass of tobacco in the end portions of cigarettes or analogous smokers' products, comprising means for conveying a succession of rod-shaped articles sideways so that a fibrous material-containing end portion of each article advances along a predetermined path; capacitor means having at least two spaced-apart electrodes adjacent to a section of said path; a source of high-frequency voltage connected with said electrodes to establish between said electrodes a high-frequency field, at least while the end portion of an article advances along said section of said path, at least a portion of said field being located in said section of said path so that the end portions of successive articles travel across said portion of said field and influence said field to an extent which is a function of the mass of fibrous material in said end portions, said source comprising an electric resonant circuit and a high-frequency oscillator connected with said circuit, said capacitor means instituting the frequency-determining component of said circuit; and means for evaluating the influence of successive end portions upon said field, comprising a second circuit which measures the value of a characteristic of signals transmitted by said resonant circuit, the value of said characteristic being a function of the mass of fibrous material in an end portion while such end portion advances along said section of said path, said evaluating means further comprising a device for maintaining said resonant circuit in a state of reasonance and said characteristic being utilized to maintain said state of resonance.

19. Apparatus for determining the mass of fibrous material in the end portions of discrete or grouped rod-shaped articles, particularly for determining the mass of tobacco in the end portions of cigarettes or analogous smokers' products, comprising means for conveying a succession of rod-shaped articles sideways so that a fibrous material-containing end portion of each article advances along a predetermined path, said conveying means comprising a series of receiving means for groups of rod-shaped articles and each such group consisting of a predetermined number of articles in a formation ready for packing of the group in one or more envelopes to form a pack; capacitor means having at least two spaced-apart electrodes adjacent to a section of said path; a source of high-frequency voltage connected with said electrodes to establish between said electrodes a high-frequency field, at least while the end portion of an article advances along said section of said path, at least a portion of said field being located in said section of said path so that the end portions of successive articles travel across said portion of said field and influence said field to an extent which is a function of the mass of fibrous material in said end portions; and means for evaluating the influence of successive end portions upon said field.

20. Apparatus for determining the mass of fibrous material in the end portions of discrete or grouped rod-shaped articles, particularly for determining the mass of tobacco in the end portions of cigarettes or analogous smokers' products, comprising means for conveying a succession of rod-shaped articles sideways so that a fibrous material-containing end portion of each articles advances along a predetermined path; means for moving said conveying means; capacitor means having at least two spaced-apart electrodes adjacent to a section of said path; means for producing signals in response to travel of rod-shaped articles along said section of said path, including proximity detector means arranged to produce a signal whenever the end portion of an article travels past said capacitor means; a source of high-frequency voltage connected with said electrodes to establish between said electrodes a high-frequency field, at least while the end portion of an article advances along said section of said path, at least a portion of said field being located in said section of said path so that the end portions of successive articles travel across said portion of said field and influence said field to an extent which is a function of the mass of fibrous material in said end portions; and means for evaluating the influence of successive end portions upon said field.

21. Apparatus for determining the mass of fibrous material in the end portions of discrete or grouped rod-shaped articles, particularly for determining the mass of tobacco in the end portions of cigarettes or analogous smokers' products, comprising means for conveying a succession of rod-shaped articles sideways so that a fibrous material-containing end portion of each article advances along a predetermined path; capacitor means having at least two spaced-apart electrodes adjacent to a section of said path; a source of high-frequency voltage connected with said electrodes to establish between said electrodes a high-frequency field, at least while the end portion of an article advances along said section of said path, at least a portion of said field being located in said section of said path so that the end portions of successive articles travel across said portion of said field and influence said field to an extent which is a function of the mass of fibrous material in said end portions; means for evaluating the influence of successive end portions upon said field, comprising a circuit arranged to produce a succession of first signals having characteristics which are indicative of the mass of fibrous material in successive end portions travelling along said section of said path; means for storing second signals the characteristics of which are independent of the mass of fibrous material in said end portions; and means for comparing each second signal with one of said first signals and for producing third signals each having a characteristic corresponding to the difference between the characteristics of a first signal and the respective second signal.

22. Apparatus as defined in claim 21, wherein said means for storing successive second signals receives said second signals from said circuit, said comparing means comprising a differential circuit having a first input connected with said signal storing means, a second input connected with said signal storing means, a second input connected with said first mentioned circuit, and an output arranged to transmit said third signals.

23. Apparatus as defined in claim 21, further comprising means for evaluating said third signals.

24. Apparatus as defined in claim 23, further comprising means actuatable to segregate the articles wherein the mass of fibrous material in the end portions thereof is without a predetermined range, said segregating means being actuated by said last mentioned evaluating means.

25. Apparatus as defined in claim 21, wherein said second signals are indicative of the characteristics of air in said section of said path during travel of end portions of articles toward said section.

26. Apparatus for determining the mass of fibrous material in the end portions of discrete or grouped rod-shaped articles, particularly for determining the mass of tobacco in the end portions of cigarettes or analogous smokers' products, comprising means for conveying a succession of rod-shaped articles sideways so that a fibrous material-containing end portion of each article advances along a predetermined path; capacitor means having at least two spaced-apart electrodes adjacent to a section of said path; a source of high-frequency voltage connected with said electrodes to establish between said electrodes a high-frequency field, at least while the end portion of an article advances along said section of said path, at least a portion of said field being located in said section of said path so that the end portions of successive articles travel across said portion of said field and influence said field to an extent which is a function of the mass of fibrous material in said end portions; means for evaluating the influence of successive end portions upon said field; means for locating successive articles in a predetermined axial position during travel of said portions along said section of said path, said locating means comprising stationary cam means adjacent to said section of said path and arranged to shift the articles axially when the axial position of articles deviates from said predetermined position.

* * * * *